Figure 1:
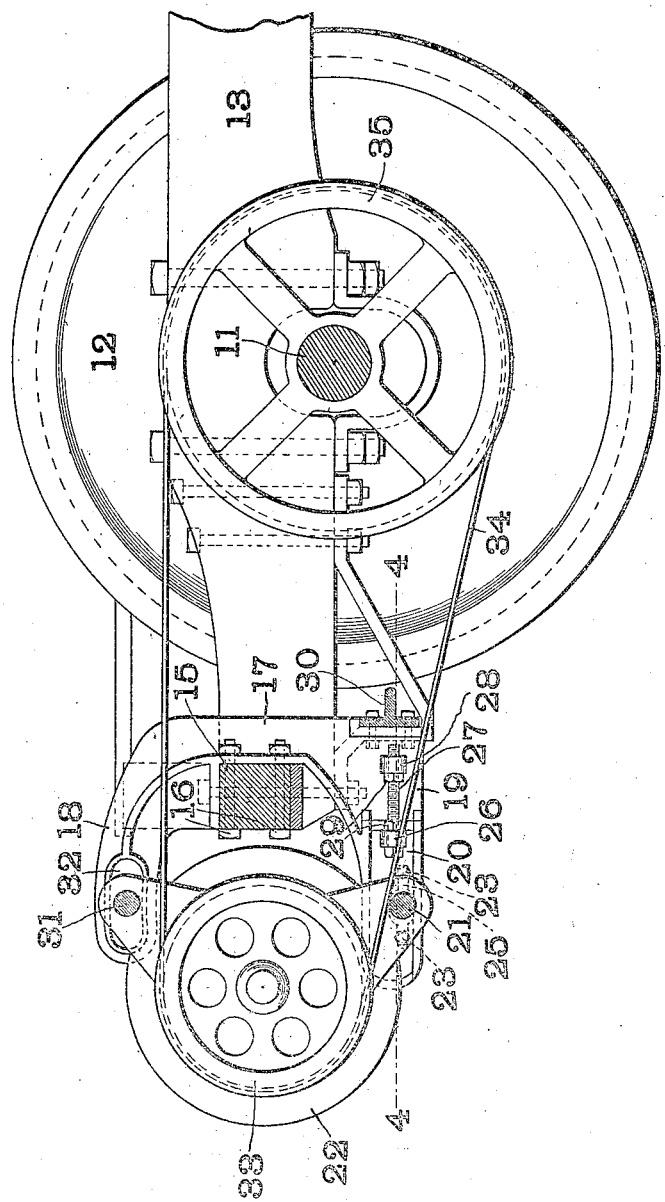

No. 909,573.

E. T. FORD.
DYNAMO DRIVE FOR CAR TRUCKS.
APPLICATION FILED JULY 29, 1907.

Patented Jan. 12, 1909.
3 SHEETS—SHEET 1.

WITNESSES:
L. L. Mead.
W. A. Alexander.

INVENTOR
E. T. Ford
BY
Fowler & Bryson
ATTORNEY

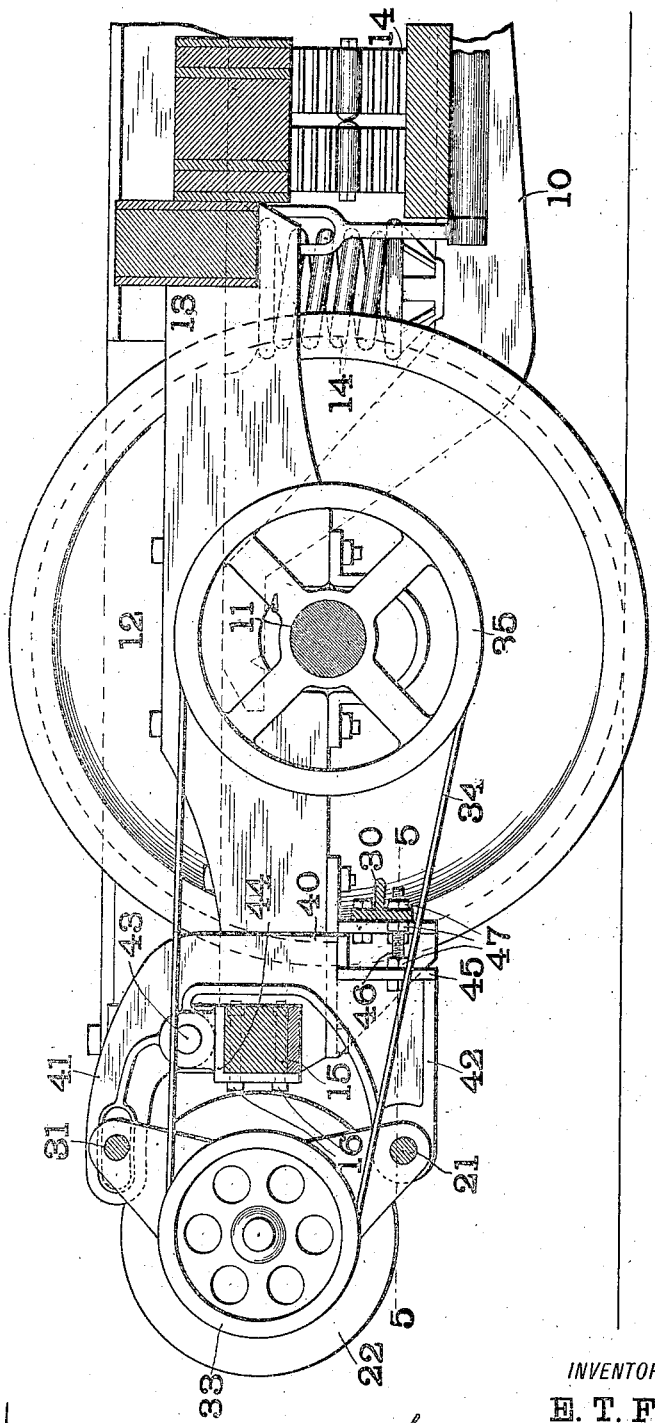

E. T. FORD.
DYNAMO DRIVE FOR CAR TRUCKS.
APPLICATION FILED JULY 29, 1907.
No. 909,573.
Patented Jan. 12, 1909.
3 SHEETS—SHEET 3.
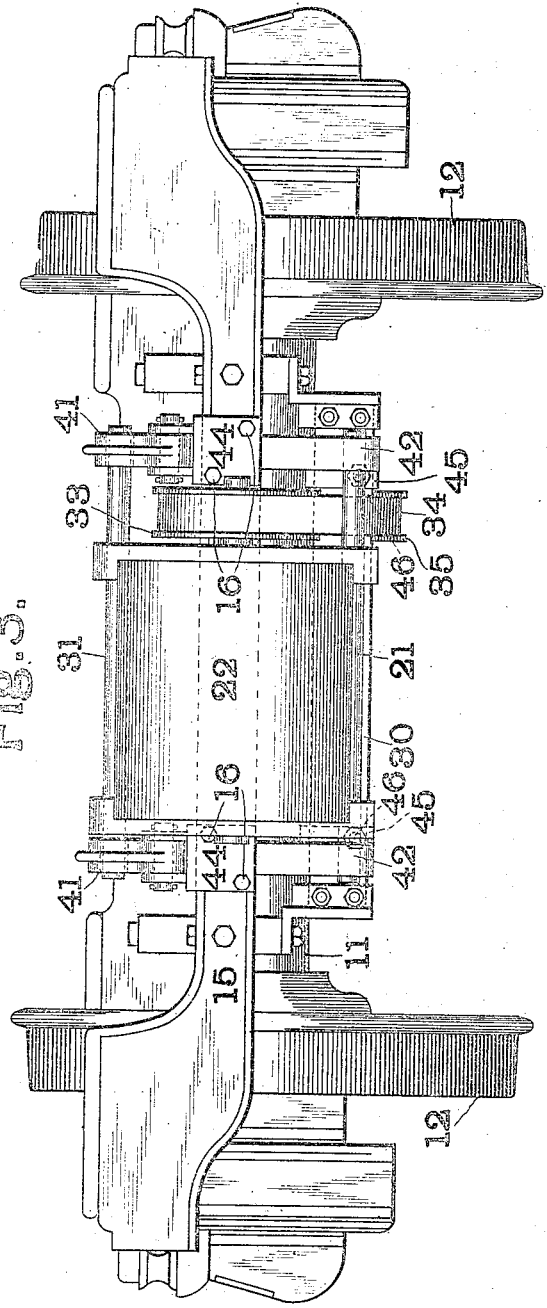
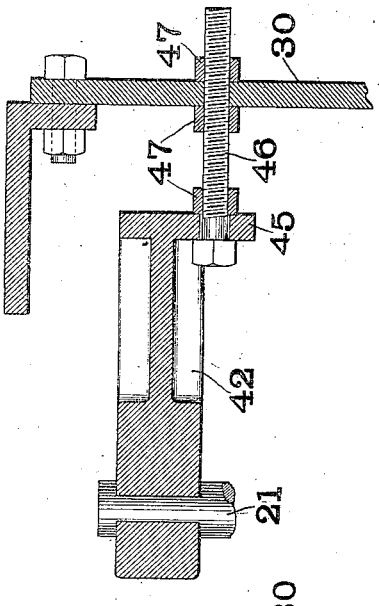
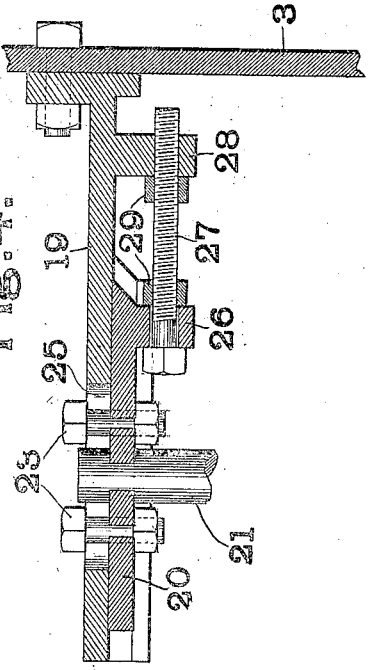
WITNESSES:
L. L. Mead.
W. A. Alexander.
INVENTOR
E. T. Ford
BY
ATTORNEY

UNITED STATES PATENT OFFICE.

ETHELBERT T. FORD, OF ST. LOUIS, MISSOURI.

DYNAMO-DRIVE FOR CAR-TRUCKS.

No. 909,573.     Specification of Letters Patent.     Patented Jan. 12, 1909.

Application filed July 29, 1907. Serial No. 386,007.

*To all whom it may concern:*

Be it known that I, ETHELBERT T. FORD, a citizen of the United States, residing at St. Louis, in the State of Missouri, have invented a certain new and useful Dynamo-Drive for Car-Trucks, of which the following is such a full, clear, and exact description as will enable any one skilled in the art to which it appertains to make and use the same, reference being had to the accompanying drawings, forming part of this specification.

My invention relates to means for mounting a dynamo for car lighting or other similar purpose upon a car truck.

The object of my invention is to so mount a dynamo that the weight of the dynamo itself will serve to maintain the driving belt taut, thus dispensing with the use of springs for tightening the belt.

Another object of my invention is to so arrange the dynamo that it can be readily inspected and can be readily removed for repairs or any other purpose.

In the accompanying drawings, which illustrate one form of mounting made in accordance with my invention, together with a slight modification thereof, Figure 1 is a vertical section through a portion of the truck, Fig. 2 is a similar view showing a slight modification, Fig. 3 is a nend view of the modification shown in Fig. 2 and Figs. 4 and 5 are enlarged detailed views taken on the lines 4—4 of Fig. 1 and 5—5 of Fig. 2, respectively.

Like marks of reference refer to similar parts in the several views of the drawings.

10 represents the truck end frames carrying the axles 11 upon which are mounted the wheels 12.

13 is the main frame of the truck which is supported from the end frames 10 by means of springs 14.

All the above parts may be of any usual form as in themselves they form no part of my invention.

Referring first to Fig. 1, the main frame 13 is provided at its end with a crossbeam 15. Secured to the crossbeam 15 by means of bolts 16 are two substantially U-shaped supports 17, each of which is provided with an upper horizontally extending arm 18 and a lower horizontally extending arm 19. Each of the lower arms 19 has mounted in it a slide 20. In these slides 20 is carried a rod 21 upon which is mounted a dynamo 22. The object of mounting the rod 21 in the slides 20 in place of mounting it directly in the arms 19 is to provide means for independently adjusting the ends of the rod toward and away from the axle 11 so as to maintain the alinement of the dynamo shaft with the axle 11. In order to secure the slides 20 in position after they have been properly adjusted, each of said slides is provided with a pair of bolts 23, as best shown in Fig. 4, which pass through the said slide and through a slot 25 in the arm 19. In order to secure the adjustment, each of the slides 20 is provided with a lug 26 through which passes a bolt 27. The end of this bolt 27 is threaded into a lug 28 on the arm 19 and a pair of lock nuts 29 are provided, one bearing against the lug 26 and the other against the lug 28. It will be evident that, by this construction, the slide 20 can be accurately adjusted by loosening the nuts on the bolts 23 and the lock nuts 29. After the adjustment is properly made, all these nuts are tightened and hold the slide firmly in adjusted position. The two U-shaped members 17 are connected by means of a crossbeam 30 to secure greater rigidity of the structure. In addition to the rod 21, the dynamo 22 carries a rod 31, the ends of which pass through slots 32 in the arms 18. The end of the slides 32 thus serve as stops to prevent the dynamo from moving too far in either direction. The dynamo shaft is provided with a driving pulley 33 which is connected by means of a belt 34 with a pulley 35 mounted on the car axle 11. It will be observed that the line connecting the center of the dynamo shaft with the center of the rod 21 is inclined at an angle of about 30° to the perpendicular and consequently a considerable proportion of the weight of the dynamo will be brought to bear upon the belt 34, thus insuring the belt's being held taut at all times. It will also be seen that the construction is such that the dynamo can be readily examined at any time and it can be removed by simply removing the rods 21 and 31.

In the modification shown in Figs. 2 and 3, the U-shaped members 17 are replaced by means of U-shaped members 40. These members 40 are each provided with an upper arm 41 and a lower arm 42 corresponding to the arms 18 and 19 of the members 17. These members, however, in place of being rigidly connected to the crossbeam 15 are pivoted at 43 to brackets 44 secured to the crossbeam by the bolts 16. The members themselves thus have independent pivotal motion with respect to the crossbeam and consequently the ends of the rod 21 can be adjusted toward and away from the axle without the intervention of the slides 20 used in the previously described structure. In this construction, the ends of the bar 21 are carried directly by the arms 42. In order to adjust the members 40 on their pivots 43, each of the arms 42 is provided with a lug 45. Passing through each of the lugs 45 is a bolt 46, which bolt passes through the crossbeam 30 and is provided with three lock nuts 47, one of which bears against the lug 45 and the others against each side of the crossbeam 30. By loosening these nuts, it is evident that the adjustment between the bar 30 and the arm 42 can be made, thus swinging the member 40 on its pivot 43. In this way the ends of the rod 21 can be independently adjusted toward and away from the car axle, thus securing the alinement of the car axle and dynamo shaft. The remaining parts of the structure are the same as in the form first described and hence further description of them is unnecessary.

In both constructions above described the slot in the upper pair of horizontal arms serves as a stop for the rod 31. The inner end of the slot serves as a stop in case anything should tend to throw the dynamo upwardly and inwardly. It is evident that the dynamo should not be allowed to move in this direction a sufficient distance to throw its center of gravity to the opposite side of the pivot point from that in which it normally stands. The outer ends of the slots also serve as stops to prevent the dynamo from swinging too far in the opposite direction in case the belt 34 should break.

Having fully described my invention, what I claim as new and desire to secure by Letters Patent of the United States is:

1. The combination with a car truck, of a crossbeam carried thereby, a pair of supports secured to said crossbeam and each provided with two horizontally extending arms, a dynamo pivotally mounted in the lower pair of said arms, a slotted connection between said dynamo and the upper pair of said arms, and a belt connecting said dynamo to the car axle and held taut by the weight of the dynamo.

2. The combination with a car truck, of a crossbeam carried thereby, a pair of supports secured to said crossbeam and each provided with two horizontally extending arms, a pivot rod extending between the lower pair of said arms and having its ends independently adjustable toward and away from the car axle, a dynamo carried by said pivot rod, a slotted connection between said dynamo and the upper pair of said arms, and a belt connecting said dynamo with the car axle and held taut by the weight of the dynamo.

3. The combination with a car truck, of a crossbeam carried thereby, a pair of supports secured to said crossbeam and each provided with two horizontally extending arms, a pair of adjustable slides carried by the lower pair of said arms, a pivot rod carried by said slides, a dynamo mounted on said pivot rod, a slotted connection between the said dynamo and the upper pair of said arms, and a belt connecting said dynamo with the car axle and held taut by the weight of the dynamo.

4. The combination with a car truck, of a cross beam carried thereby, a supporting bracket extending around the rear side of said cross beam and provided with a pair of arms, and a dynamo pivoted to one of said arms and having sliding connection with the other.

5. The combination with a car truck, of a cross beam carried thereby, a supporting bracket extending around the rear side of said cross beam and provided with a pair of arms, and a dynamo adjustably pivoted to one of said arms and having sliding connection with the other.

6. The combination with a car truck, of a cross beam carried thereby, a supporting bracket pivoted to said cross beam and extending around the rear side thereof and provided with a pair of arms, and a dynamo pivoted to one of said arms and having sliding connection with the other.

In testimony whereof, I have hereunto set my hand and affixed my seal in the presence of the two subscribing witnesses.

ETHELBERT T. FORD. [L. S.]

Witnesses:
  HAROLD R. SMALL,
  W. A. ALEXANDER.